(12) United States Patent
Ishigaki et al.

(10) Patent No.: US 8,534,311 B2
(45) Date of Patent: Sep. 17, 2013

(54) VACUUM VALVE (75) Inventors: Tsuneo Ishigaki, Tsukubamirai (JP);
Hiroshi Ogawa, Tsukubamirai (JP);
Hiromi Shimoda, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 227 days.

(21) Appl. No.: 13/109,388

(22) Filed: May 17, 2011

(65) Prior Publication Data
US 2011/0290340 A1 Dec. 1, 2011

(30) Foreign Application Priority Data

May 25, 2010 (JP) .................. 2010-119858

(51) Int. Cl.
*F16K 25/00* (2006.01)
*F16K 49/00* (2006.01)
(52) U.S. Cl.
USPC ........................................ 137/341; 251/203
(58) Field of Classification Search
USPC .................. 137/341, 334; 251/203, 204, 298
See application file for complete search history.

(56) References Cited

U.S. PATENT DOCUMENTS

| | | | | |
|---|---|---|---|---|
| 5,013,009 A | * | 5/1991 | Nelson | 251/357 |
| 5,116,023 A | * | 5/1992 | Contin | 251/203 |
| 5,413,139 A | * | 5/1995 | Kusumoto et al. | 137/341 |
| 5,755,255 A | * | 5/1998 | Iwabuchi | 137/341 |
| 6,082,706 A | * | 7/2000 | Irie | 251/158 |

FOREIGN PATENT DOCUMENTS

| | | |
|---|---|---|
| CN | 2709730 Y | 7/2005 |
| EP | 1 087 159 A1 | 3/2001 |
| JP | 9-269072 | 10/1997 |
| JP | 11-325313 | 11/1999 |

OTHER PUBLICATIONS

First Notification of Reasons for Refusal issued Nov. 5, 2012 in Chinese Patent Application No. 201110137359.

* cited by examiner

*Primary Examiner* — John K Fristoe, Jr.
*Assistant Examiner* — Kevin E Lynn
(74) *Attorney, Agent, or Firm* — Oblon, Spivak, McClelland, Maier & Neustadt, L.L.P.

(57) ABSTRACT

A cartridge heater is accommodated in a heater bore in a shaft connected to a valve element, and a heating portion provided at an end portion of the cartridge heater is located at a joint portion of the shaft and the valve element. At the joint portion, a heat receiving groove and a pressurizing portion communicating with the heater bore are provided at a position between a surface of the valve element and that of the shaft located so as to oppose and to contact each other. The heat receiving groove includes an arcuate groove portion of the same radius as that of the heating portion of the cartridge heater, and the heating portion is pressed by the pressurizing portion to enter into plane-to-plane contact with an inner circumferential surface of the arcuate groove portion of the heat receiving groove, upon fastening the valve element and the shaft to each other with a bolt, with the heating portion located between the heat receiving groove and the pressurizing portion.

16 Claims, 5 Drawing Sheets

VACUUM VALVE

BACKGROUND OF THE INVENTION

[1] Field of the Invention

The present invention relates to a vacuum valve to be attached to a vacuum chamber of a semiconductor manufacturing apparatus, for opening and closing an aperture communicating with the vacuum chamber.

[2] Description of the Related Art

In semiconductor manufacturing apparatuses, a vacuum valve is employed for opening and closing an aperture communicating with a vacuum chamber. The vacuum valve includes a valve housing having the aperture, a valve element accommodated therein, a shaft having an end portion connected to the valve element, and a valve element driving unit that drives the shaft thereby causing the valve element to open and close the aperture.

In the vacuum valve, substances generated from a reaction are deposited onto a portion exposed to a reaction gas thereby affecting the opening and closing action of the valve element, and hence it is essential to prevent deposition of such substances. For this purpose, conventionally, a heater has been attached to the portion exposed to the reaction gas, such as the valve element and the shaft, to heat the valve, particularly the valve element, as described in Patent document, Japanese Unexamined Patent Application Publication No. 9-269072, and Patent document, Japanese Unexamined Patent Application Publication No. 11-325313.

Regarding the heating methods disclosed in Patent Literature 1 and Patent Literature 2, however, such a method as providing a heater inside the shaft and a hot plate at the back of the valve element, thereby transmitting the heat of the heater to the valve element through the hot plate, is an indirect heating method with the intermediation of the hot plate, and hence has a drawback that sufficient heat transfer efficiency cannot be attained. Another method is forming a loop-shaped groove in the back of the valve element along a periphery thereof, and placing a heater in the groove thereby heating the valve element, however the formation of the loop-shaped groove in the valve element is a troublesome work, and besides a seal plate and the hot plate have to be attached to the back of the valve element to tightly seal the groove, and therefore the attachment mechanism of the heater becomes so complicated that the heater cannot be replaced.

SUMMARY OF INVENTION

An object of the present invention is to provide a vacuum valve that allows a valve element to be heated directly and efficiently by a heater, and the heater to be easily attached to the valve element and the shaft and to be easily replaced.

To achieve the foregoing object, the present invention provides a vacuum valve that includes a valve housing with an aperture and a valve element accommodated therein, a shaft having an end portion connected to the valve element, and a valve element driving unit that drives the shaft thereby causing the valve element to open and close the aperture, wherein a column-shaped cartridge heater is accommodated in a circular heater bore formed in the shaft so as to extend in an axial direction thereof, and a heating portion provided at an end portion of the cartridge heater is located at a joint portion of the shaft and the valve element; and at the joint portion, a heat receiving groove and a pressurizing portion communicating with the heater bore are provided at a position between a surface of the valve element and that of the shaft located so as to oppose and to contact each other; the heat receiving groove includes an arcuate groove portion of the same radius as that of the heating portion of the cartridge heater; and the heating portion is pressed by the pressurizing portion to enter into plane-to-plane contact with an inner circumferential surface of the arcuate groove portion of the heat receiving groove, upon fastening the valve element and the shaft to each other with a bolt, with the heating portion located between the heat receiving groove and the pressurizing portion.

According to the present invention, it is preferable that in the joint portion the valve element includes a joint bore formed therein so as to extend in a widthwise direction thereof; the shaft includes a joint stem formed on the end portion so as to extend in an axial direction thereof and to be fitted in the joint bore; and the heat receiving groove and the pressurizing portion are formed on a wall of the joint bore and a wall of the joint stem disposed so as to contact each other.

According to the present invention, it is preferable that the shaft includes a pressurizing groove formed so as to oppose the heat receiving groove, and the pressurizing portion is formed on a surface of the pressurizing groove.

According to the present invention, an end portion of the heater bore may communicate with inside of the valve housing through the heat receiving groove at the joint portion of the shaft and the valve element, and a base portion of the heater bore may be air-tightly closed, so that vacuum is created in the heat receiving groove and the heater bore when the inside of the valve housing becomes vacuum.

According to the present invention, it is preferable that the valve element is made of an aluminum alloy, and the shaft is made of a stainless steel.

According to the present invention, the outer circumferential surface of the heating portion of the cartridge heater is brought into plane-to-plane contact with the inner circumferential surface of the arcuate heat receiving groove formed on the valve element, so that the valve element is directly heated by heat conduction, and therefore higher heat transfer efficiency can be attained in comparison with heat transfer by radiation, and the valve element can be efficiently heated. Also, the cartridge heater is inserted in the heater bore of the shaft such that the heating portion is located between the heat receiving groove of the valve element and the pressurizing portion of the shaft, and the heating portion is pressed into close contact with the heat receiving groove by the pressurizing portion, by fastening the valve element and the shaft with the bolt, and therefore the cartridge heater can be easily attached and replaced.

DESCRIPTION OF THE PREFERRED EMBODIMENTS

Figure 1:
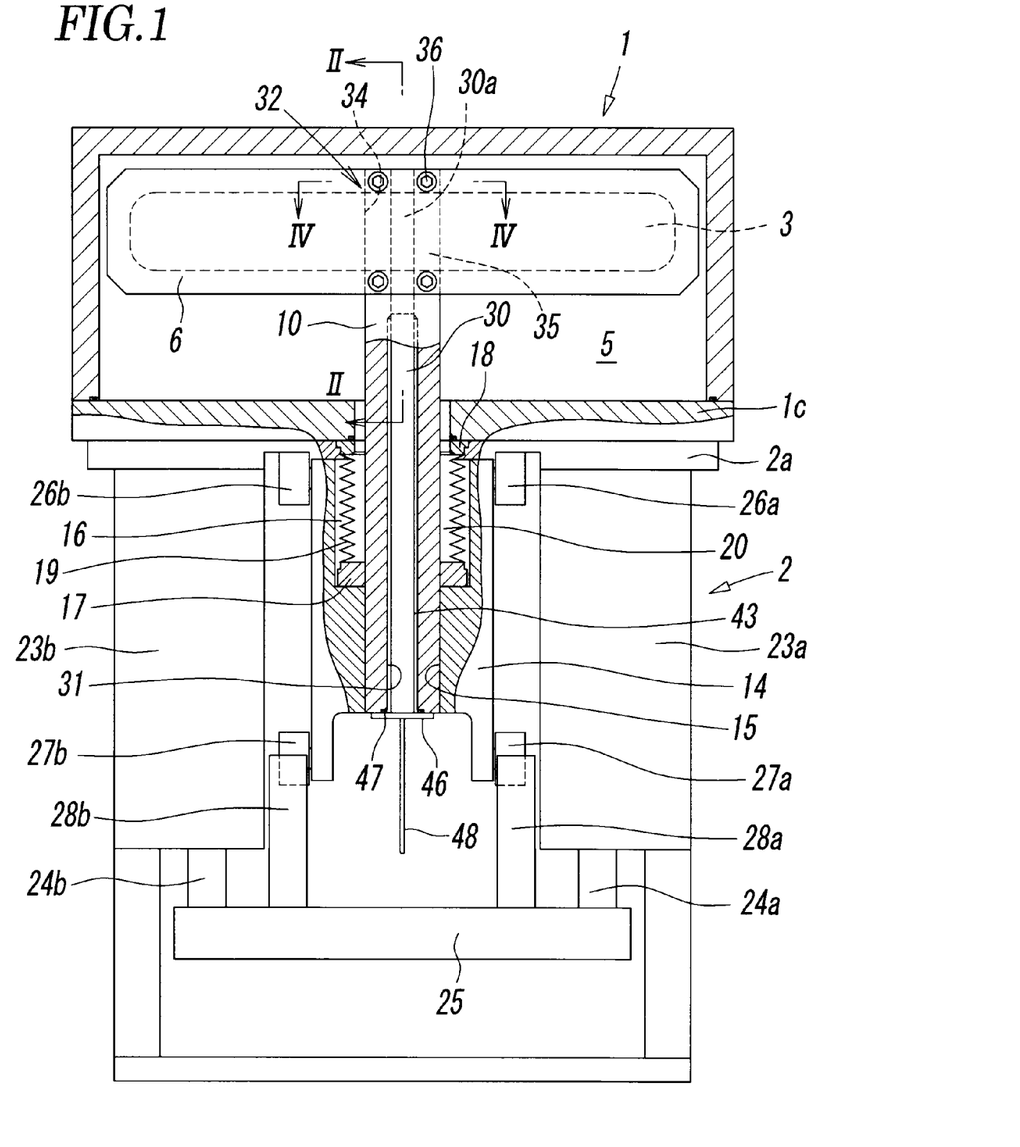
FIG. 1 is a partially cut away rear view from behind a valve element, of a vacuum valve according to an embodiment of the present invention.

FIG. 1 is a partially cut away schematic drawing of a vacuum valve according to an embodiment of the present invention. The vacuum valve is to be connected to a vacuum chamber of a semiconductor manufacturing apparatus and is for opening and closing an aperture 3 communicating with the vacuum chamber, upon such occasions as ventilating the vacuum chamber and bringing or taking semiconductor wafers into or out of the vacuum chamber.

The vacuum valve includes a valve housing 1 to be connected to the vacuum chamber, and a valve element driving unit 2 placed under the valve housing 1.

Figure 2:
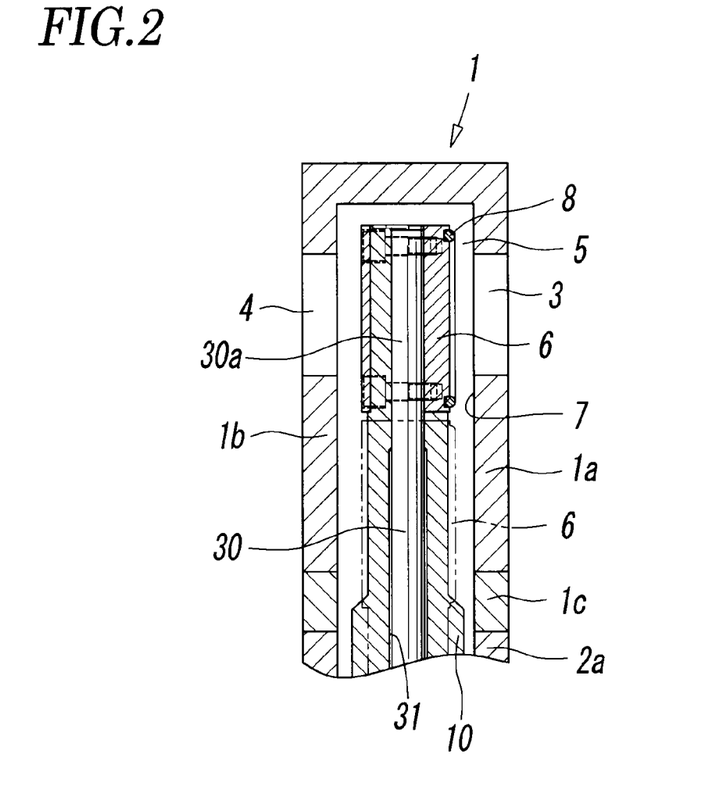
FIG. 2 is a cross-sectional view taken along a line II-II in FIG. 1.

The valve housing 1 is of a rectangular box shape that is wider than it is tall, and includes a first aperture 3 and a second aperture 4 of a rectangular shape that is wider than it is tall for allowing communication with the vacuum chamber, formed in a front wall 1a and a rear wall 1b opposing each other, as shown in FIG. 2, and a valve element 6 of a rectangular shape that is wider than it is tall that opens and closes the first aperture 3 in the front wall 1a is accommodated in a valve chamber 5 in the valve housing 1. The front wall 1a includes a rectangular or elliptical valve seat portion 7 formed on an inner surface thereof so as to surround the first aperture 3, and a rectangular or elliptical valve seal 8 is attached to a front face of the valve element 6, so as to contact the valve seat portion 7 and thus close the first aperture 3.

An end portion (upper end portion) of a shaft 10 is connected to a longitudinal central portion of the valve element 6, and a base portion (lower end portion) of the shaft 10 is disposed contactlessly through a bottom wall 1c of the valve housing 1 and an upper wall 2a of the driving unit fixed to the bottom wall 1c, and extends into the inside of the valve element driving unit 2.

A cap 14 having a generally H-shaped vertical cross-sectional shape and a generally rectangular plan-view shape is attached to the base portion of the shaft 10, by fitting the base portion into a joint bore 15 of the cap 14.

A first support ring 17 that air-tightly surrounds the shaft 10 is attached to an inner bottom portion of a central bore 16 of the cap 14, and a second support ring 18 surrounding the shaft 10 is air-tightly attached to the upper wall 2a of the driving unit with an O-ring therebetween. An end portion and the other end portion of bellows 19 surrounding the shaft 10 are air-tightly fixed to the first support ring 17 and the second support ring 18, respectively.

A space 20 between the inner surface of the bellows 19 and the outer surface of the shaft 10 communicates with the valve chamber 5, but is isolated from ambient air. Accordingly, the valve chamber 5 is a tightly closed space, except for the two apertures 3 and 4.

The valve element driving unit 2 has substantially the same configuration as the valve element driving unit in a high vacuum valve according to Japanese Unexamined Patent Application Publication No. 11-325315 proposed by the present applicant, and since the configuration thereof is publicly known only brief description will be given hereunder.

The valve element driving unit 2 includes a left and right pair of air cylinders 23a, 23b attached to the upper wall 2a of the driving unit, and piston rods 24a, 24b of the air cylinders 23a, 23b are connected to a transmission member 25, which is connected to the cap 14 by means of a joint mechanism (not shown). The joint mechanism serves to connect the transmission member 25 and the cap 14 so that they move relative to each other in an axial direction of the shaft 10 but so that they do not move away from each other by more than a predetermined distance, and a spring disposed between the transmission member 25 and the cap 14 exerts a biasing force on the transmission member 25 and the cap 14 so as to usually keep them apart by the predetermined distance.

The valve element driving unit 2 extends and shortens the piston rods 24a, 24b of the air cylinders 23a, 23b to move the shaft 10 up and down with respect to the orientation of FIG. 1 via the transmission member 25 and the cap 14, thereby moving the valve element 6 connected to the upper end portion of the shaft 10 to a fully open position where the first aperture 3 is fully open (indicated by chain lines in FIG. 2), an opposing position where the valve element 6 is located so as to confront, but not to close the first aperture 3 (indicated by solid lines in FIG. 2), and a closing position where the valve seal 8 is pressed against the valve seat portion 7 so as to close the first aperture 3.

Reference numerals 26a, 26b in FIG. 1 designate fulcrum rollers attached to the respective sides of the cap 14 at positions close to the upper end portion thereof, numerals 27a, 27b designate guide rollers attached to the respective sides of the cap 14 at positions close to the lower end portion thereof; and numerals 28a, 28b designate cam plates attached to the transmission member 25; and the cam plates 28a, 28b each include a cam groove to be engaged with the guide roller 27a, 27b, and the fulcrum rollers 26a, 26b, guide rollers 27a, 27b, and the cam plates 28a, 28b operate as follows, to cause the valve element 6 to perform the opening and closing action.

When the piston rods 24a, 24b are shortened from a state where the valve element 6 is at the fully open position until the shaft 10 and the cap 14 reach the opposing position together with the transmission member 25, the fulcrum rollers 26a, 26b make contact with a stopper provided on a side face of the air cylinders 23a, 23b, thereby stopping the shaft 10 and the cap 14 at the opposing position.

After the cap 14 is stopped at the opposing position, the transmission member 25 continues to be driven by the piston rods 24a, 24b with the intermediation of the joint mechanism so as to move further upward with respect to the cap 14, and hence the cam plates 28a, 28b attached to the transmission member 25 move with respect to the guide rollers 27a, 27b. As a result, the guide rollers 27a, 27b are displaced along a slope of a cam groove formed on the respective cam plates 28a, 28b, so as to cause the shaft 10 to tilt about the fulcrum rollers 26a, 26b, so that the valve seal 8 of the valve element 6 is pressed against the valve seat portion 7 and thus the valve element 6 reaches the closing position.

To move the valve element 6 from the closing position to the fully open position so as to fully open the first aperture 3, the foregoing operation is performed in reverse.

The vacuum valve includes a cartridge heater 30, for preventing deposition of substances generated from reaction gas onto the valve element 6. To attach the cartridge heater, the shaft 10 includes a circular heater bore 31 formed so as to linearly extend along the center of the shaft 10, and the cartridge heater 30 of a straight column shape is accommodated in the heater bore 31, and positioned such that a heating portion 30a located at an end portion of the cartridge heater 30 makes direct contact with the valve element 6 at a joint portion 32 of the shaft 10 and the valve element 6.

The shaft 10 and the valve element 6 coupled at the joint portion 32 as described below. As is apparent from FIGS. 2 to 6, the valve element 6 includes a joint bore 34 formed so as to penetrate through the valve element 6 in a widthwise direction thereof (axial direction of the shaft 10). On the other hand, the shaft 10 includes a joint stem 35 formed so as to axially extend from the upper end portion of the shaft 10, and the valve element 6 and the shaft 10 are fastened together, by fitting the joint stem 35 into the joint bore 34 and fastening the joint stem 35 to the valve element 6 with four bolts 36.

Figure 6:
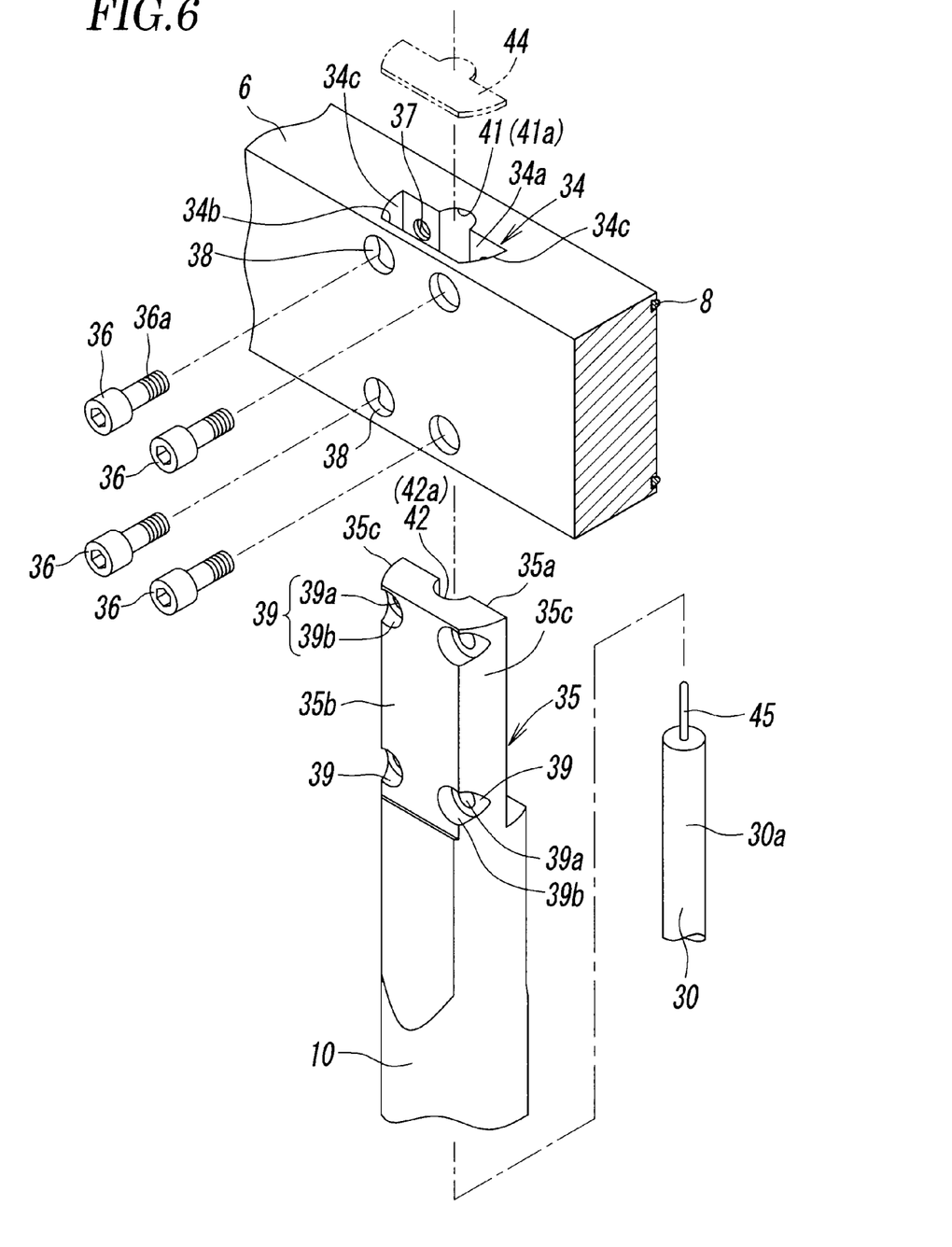
FIG. 6 is an exploded perspective view showing an essential part of the valve element, a shaft, and the cartridge heater.

The joint bore 34 is defined by a first bore wall 34a and a second bore wall 34b which are flat and parallel to each other, and two arcuate side walls 34c constituting a part of the circumference, and the first bore wall 34a is located at a central portion of the valve element 6 in a thicknesswise direction, so that the joint bore 34 is biased toward the rear face of the valve element 6. The first bore wall 34a includes four threaded holes 37 into each of which a male thread portion 36a of the bolt 36 is to be thread-fitted, formed at left and right corresponding positions close to the upper and lower end portions of the valve element 6, and the second bore wall 34b includes four bolt insertion holes 38, into which the bolts 36 are to be respectively inserted.

Likewise, the joint stem 35 is surrounded by a first stem wall 35a and a second stem wall 35b which are flat and parallel to each other, and two arcuate side walls 35c constituting a part of the circumference, and the first stem wall 35a is located along the central axis of the shaft 10, so that the joint stem 35 is biased to one side from the center of the shaft 10. The joint stem 35 includes four bolt insertion holes 39, including minor diameter holes 39a into which the male thread portion 36a of the bolt 36 is to be fitted and major diameter holes 39b into which the head 36b of the bolt 36 is to be fitted, located at positions corresponding to the threaded holes 37.

The joint stem 35 has a cross-sectional shape that is generally similar to that of the joint bore 34, and is formed in a slightly smaller diameter than the joint bore 34 so as to be fitted thereinto with slight play, and the first stem wall 35a is slightly spaced apart from the first bore wall 34a of the joint bore 34 when the bolts 36 are not fastened.

Figure 4:
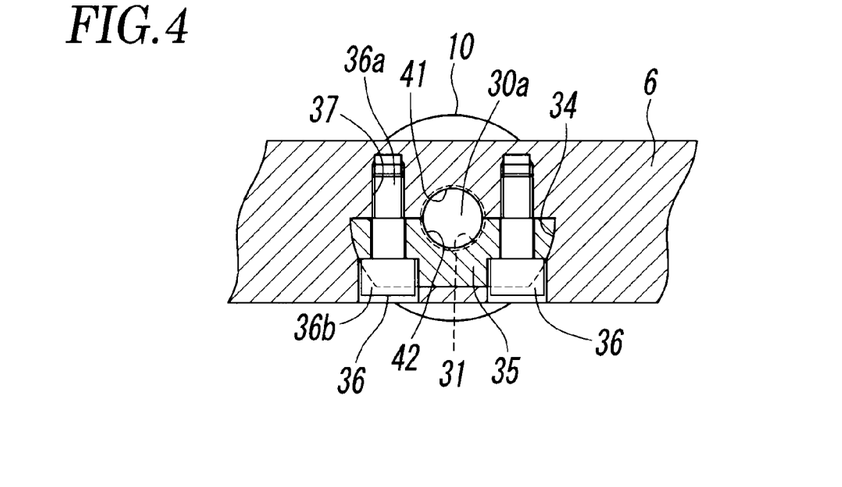
FIG. 4 is a cross-sectional view taken along a line IV-IV in FIG. 1.
Figure 5:
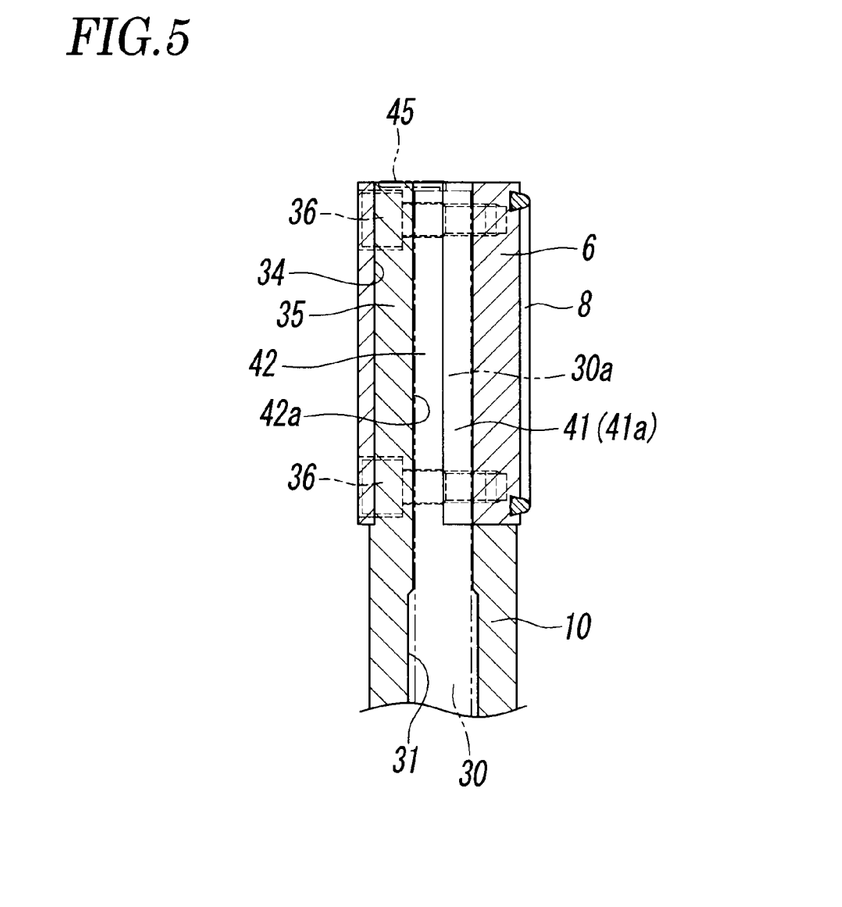
FIG. 5 is a vertical cross-sectional view of FIG. 4, indicating a cartridge heater by imaginary lines.

In the first bore wall 34a of the joint bore 34 and the first stem wall 35a of the joint stem 35, which are to contact each other, an arcuate heat receiving groove 41 and an arcuate pressurizing groove 42 are formed at corresponding positions so as to oppose each other across the axial line of the shaft 10, and the heat receiving groove 41 and the pressurizing groove 42 define a heat receiving bore 40 concentric with the heater bore 31 and communicating therewith, and the heating portion 30a of the cartridge heater 30 is fitted into the heat receiving bore 40.

The heat receiving groove 41 and the pressurizing groove 42 are both of a semicircular shape formed by dividing a circle in two, in a radius substantially the same as that of the heating portion 30a of the cartridge heater 30, and hence the diameter of the heat receiving bore 40 is substantially the same as that of the heating portion 30a. However, the diameter of the heater bore 31 is slightly larger than the diameter of the heat receiving bore 40, i.e., the diameter of the cartridge heater 30.

Accordingly, upon fastening the bolts 36 with the heating portion 30a interposed between the heat receiving groove 41 and the pressurizing groove 42 thereby fixing the shaft 10 and the valve element 6 together, the heating portion 30a is pressed from both sides by the heat receiving groove 41 and the pressurizing groove 42 because of the fastening force of the bolts 36, and the surface of the pressurizing groove 42 serves as a pressurizing portion 42a that strongly presses the heating portion 30a against the heat receiving groove 41, so that a half of the circumferential surface of the heating portion 30a is brought into plane-to-plane contact with the entire inner circumferential surface of the heat receiving groove 41. At this moment, the remaining half of the circumferential surface of the heating portion 30a is brought into close plane-to-plane contact with the pressurizing groove 42. On the other hand, a space 43 is created between the inner circumferential surface of the heater bore 31 and the outer circumferential surface of the cartridge heater 30, because of a difference in diameter between the heater bore 31 and the cartridge heater 30.

A sheath sensor (thermocouple) 45 extends from the upper end of the cartridge heater 30 into the joint bore 34, and the sheath sensor 45 is laterally bent and thus made to contact the upper end of the joint stem 35 of the shaft 10.

Although the top portion of the joint bore 34 is open in the illustrated example, a cover plate 44 may be attached to the top portion so as to cover the joint bore 34 and the heat receiving groove 41 as indicated by chain lines in FIG. 6, so that the cover plate 44 can press the sheath sensor 45 against the upper end of the joint stem 35. The cover plate 44 can be fixed to the top portion of the joint stem 35 with a screw. However, the cover plate 44 does not have to air-tightly seal the joint bore 34.

As shown in FIG. 1, a heater flange 46 larger in diameter than the heater bore 31 is integrally attached to the base portion of the cartridge heater 30, and the heater flange 46 is fixed to the lower end face of the shaft 10 with a heater packing 47 therebetween, so that the lower end portion of the heater bore 31 is air-tightly closed by the heater flange 46 and the heater packing 47. A lead wire 48 connected to the cartridge heater 30 and the sheath sensor 45 is air-tightly passed through the heater flange 46 and extends outward.

In contrast, the upper end portion of the heater bore 31 communicates with the valve chamber 5 through a fine gap formed between the inner surface of the joint bore 34 and the outer surface of the joint stem 35 at a position corresponding to the joint portion 32 of the valve element 6 and the shaft 10, and a fine gap formed between the inner surface of the heat receiving groove 41 and the pressurizing groove 42 and the outer surface of the heating portion 30a. Accordingly, when the valve chamber 5 is in a vacuum state, a space in the heat receiving groove 41 and the pressurizing groove 42, and the inside of the heater bore 31 also become a vacuum.

With the cartridge heater 30 thus attached, upon supplying power to the cartridge heater 30 thereby heating the heating portion 30a when the vacuum valve is activated, the valve element 6 is heated by the heating portion 30a, and substances generated by reaction gas are suppressed from being deposited onto the valve element 6. In this process, since the outer circumferential surface of the heating portion 30a is in close plane-to-plane contact with the inner circumferential surface of the arcuate heat receiving groove 41 formed on the valve element 6, the heat of the heating portion 30a can be directly transferred to the valve element 6 by heat conduction, and in addition the heat transfer is performed over a larger area and hence higher heating efficiency can be attained.

The foregoing heating method with the cartridge heater 30 provides excellent heating efficiency whether the valve element 6 and the shaft 10 are made of an aluminum alloy or a stainless steel, however a prominent performance can be attained in the case where the valve element 6 is made of an aluminum alloy and the shaft 10 is made of a stainless steel.

In general, the heat conductance of stainless steel is approx. 14 W/mk while that of aluminum alloy is approx. 170 W/mk, which is approximately 12 times that of stainless steel. Regarding a radiation factor, on the other hand, the radiation factor of stainless steel is approx. 0.4 while that of aluminum alloy is 0.04, which is one tenth that of stainless steel. Also, stainless steel is more receptive to radiation heat in proportion to its higher radiation factor, but also radiative emission is also high.

Accordingly, transferring heat from the heater to the valve element primarily by heat conduction thereby suppressing radiative emission enables efficient heat transfer to the valve element made of an aluminum alloy.

In this embodiment, therefore, the heat receiving groove 41 of the valve element 6 is formed in an arcuate shape, and the heating portion 30a of the cartridge heater 30 is brought into close plane-to-plane contact with the heat receiving groove 41, so that heat transfer is primarily performed by heat conduction. In this case, although the heating portion 30a is also in plane-to-plane contact with the pressurizing groove 42 of the shaft 10, since the heat conductance of stainless steel is much lower than that of aluminum alloy as stated above, only a small amount of heat is transferred to the shaft 10.

Consequently, a majority of the heat from the heating portion 30a can be transferred to the valve element 6 as above, so that the valve element 6 can be efficiently heated. In particular, since the valve element 6 of an aluminum alloy has excellent heat conductance, the entirety of the valve element 6 can be uniformly heated merely by heating a part thereof at the position of the heat receiving groove 41, and since the shaft 10 of a stainless steel has a low heat conductance, only a small amount of heat is emitted outward through the shaft 10, and hence heat loss can be suppressed.

Further, the contact surface between the heating portion 30a and the valve element 6 is a circumferential surface, and therefore defective contact arising from a difference in linear expansion or thermal deformation can be prevented.

Also, although the space in the heat receiving groove 41 and the pressurizing groove 42 becomes a vacuum when the vacuum valve is activated and the valve chamber 5 becomes a vacuum, since the heat from the heating portion 30a of the cartridge heater 30 is directly transferred to the valve element 6 by heat conduction, the valve element 6 can be efficiently heated by the heating portion 30a.

Removal of the cartridge heater 30 can be executed through loosening or removing the bolts 36 fixing the shaft 10 and the valve element 6 together, detaching the heater flange 46 from the shaft 10, and the cover plate 44 in the case where it is attached, and drawing out the cartridge heater 30 downward from the heater bore 31.

Figure 7:
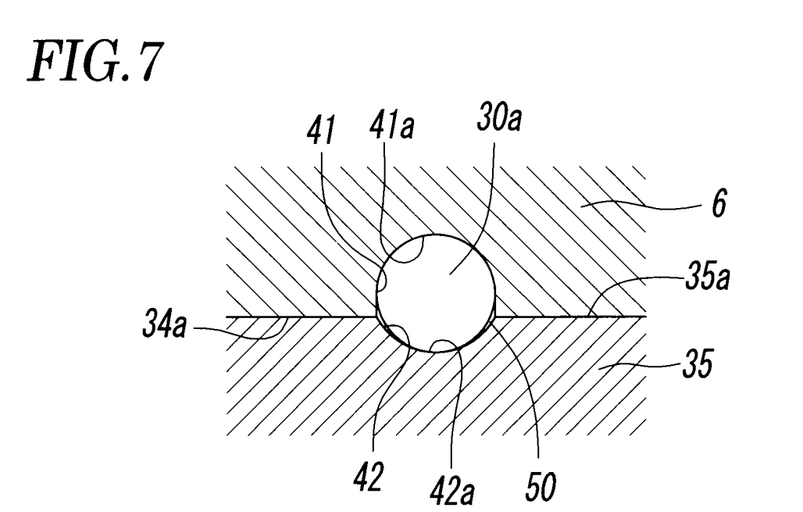
FIG. 7 is a fragmentary cross-sectional view of a variation of a joint portion of the valve element and the shaft.

Although the heat receiving groove 41 and the pressurizing groove 42 are both formed in a semicircular shape in the foregoing embodiment, it suffices that the heat receiving groove 41 alone be arcuate, more preferably semicircular so as to achieve plane-to-plane contact with the heating portion 30a, and the pressurizing groove 42 may be arcuate or of another shape. For example, the heat receiving groove 41 may include an arcuate, more preferably a semicircular groove portion 41a of the same radius as that of the heating portion 30a, and the pressurizing groove 42 may be formed in a shallow arcuate shape of a larger radius than that of the heating portion 30a, as shown in FIG. 7. In this case, the portion of the pressurizing groove 42 that makes contact with the heating portion 30a serves as the pressurizing portion 42a.

In this case, although a gap 50 is created between the heating portion 30a and each of the heat receiving groove 41 and the pressurizing groove 42, across which heat transfer is performed by radiation, since a much larger amount of heat is transferred by heat conduction from the heating portion 30a to the valve element 6 through the arcuate groove portion 41a of the heat receiving groove 41 than by radiation from the heating portion 30a to the valve element 6 and the shaft 10, high heat transfer efficiency can equally be attained.

Figure 3:
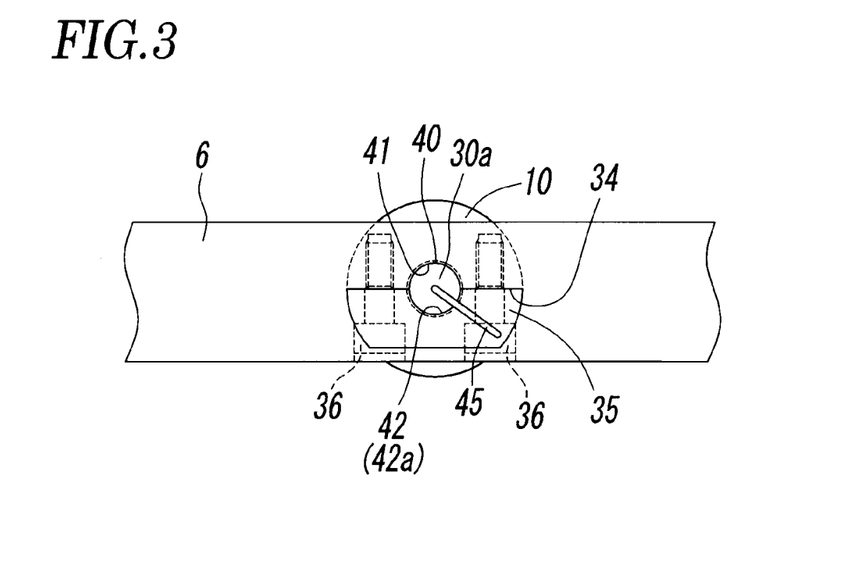
FIG. 3 is an enlarged fragmentary plan view of the valve element.

Regarding the embodiment shown in FIGS. 3 and 4, the semicircular heat receiving groove 41 can be described as having the arcuate groove portion 41a over the entirety thereof, and the pressurizing groove 42 can be described as having the arcuate pressurizing portion 42a over the entirety thereof.

Further, instead of forming the joint bore 34 configured as above in the valve element 6, a recess may be formed in a rear face of the valve element 6 and the shaft 10 may be made to contact the valve element 6 and fastened thereto with the bolts 36. Alternatively, the shaft 10 may be attached to the rear face of the valve element 6 and fastened thereto with the bolts 36, with neither the joint bore 34 nor the recess.

The invention claimed is:

1. A vacuum valve including a valve element accommodated in a valve housing with an aperture, a shaft having an end portion connected to the valve element by attaching a surface of a wall formed on the valve element and a surface of a wall formed on the shaft to each other and fastening the surfaces of the walls to each other with a bolt, and a valve element driving unit that drives the shaft thereby causing the valve element to open and close the aperture, wherein:
   a column-shaped cartridge heater is accommodated in a circular heater bore formed in the shaft so as to extend in an axial direction thereof, and a heating portion provided at an end portion of the cartridge heater is located at a joint portion in which the surfaces of the walls of the shaft and the valve element are attached to each other; and
   at the joint portion, a heat receiving groove and a pressurizing portion each communicating with the heater bore are provided at corresponding positions between the surface of the wall of the valve element and the surface of the wall of the shaft located so as to oppose and to contact each other; the heat receiving groove is formed on the wall of the valve element and includes an arcuate groove portion of the same radius as the heating portion of the cartridge heater; and the pressurizing portion is formed on the wall of the shaft; and the heating portion is pressed by the pressurizing portion to come into plane-to-plane contact with an inner circumferential surface of the arcuate groove portion of the heat receiving groove, upon fastening the valve element and the shaft to each other with the bolt, with the heating portion located between the heat receiving groove and the pressurizing portion.

2. The vacuum valve according to claim 1, wherein, in the joint portion, a joint bore extending in a widthwise direction of the valve element is formed in the valve element, the shaft includes a joint stem formed on the end portion so as to extend in an axial direction thereof and to be fitted into the joint bore, and the heat receiving groove and the pressurizing portion are formed in a bore wall of the joint bore and a stem wall of the joint stem disposed so as to contact each other.

3. The vacuum valve according to claim 1, wherein a pressurizing groove opposite to the heat receiving groove is formed in the shaft, and the pressurizing portion is formed on a surface of the pressurizing groove.

4. The vacuum valve according to claim 2, wherein a pressurizing groove opposite to the heat receiving groove is formed in the shaft, and the pressurizing portion is formed on a surface of the pressurizing groove.

5. The vacuum valve according to claim 1, wherein an end portion of the heater bore communicates with the inside of the valve housing through the heat receiving groove at the joint portion of the shaft and the valve element, and a base portion of the heater bore is air-tightly closed, so that a vacuum is created in the heat receiving groove and the heater bore when the inside of the valve housing becomes a vacuum.

6. The vacuum valve according to of claim 2, wherein an end portion of the heater bore communicates with the inside of the valve housing through the heat receiving groove at the joint portion of the shaft and the valve element, and a base portion of the heater bore is air-tightly closed, so that a vacuum is created in the heat receiving groove and the heater bore when the inside of the valve housing becomes a vacuum.

7. The vacuum valve according to claim 3, wherein an end portion of the heater bore communicates with the inside of the valve housing through the heat receiving groove at the joint portion of the shaft and the valve element, and a base portion of the heater bore is air-tightly closed, so that a vacuum is created in the heat receiving groove and the heater bore when the inside of the valve housing becomes a vacuum.

8. The vacuum valve according to claim 4, wherein an end portion of the heater bore communicates with the inside of the valve housing through the heat receiving groove at the joint portion of the shaft and the valve element, and a base portion of the heater bore is air-tightly closed, so that a vacuum is created in the heat receiving groove and the heater bore when the inside of the valve housing becomes a vacuum.

9. The vacuum valve according to claim 1, wherein the valve element is made of an aluminum alloy, and the shaft is made of a stainless steel.

10. The vacuum valve according to claim 2, wherein the valve element is made of an aluminum alloy, and the shaft is made of a stainless steel.

11. The vacuum valve according to claim 3, wherein the valve element is made of an aluminum alloy, and the shaft is made of a stainless steel.

12. The vacuum valve according to claim 4, wherein the valve element is made of an aluminum alloy, and the shaft is made of a stainless steel.

13. The vacuum valve according to claim 5, wherein the valve element is made of an aluminum alloy, and the shaft is made of a stainless steel.

14. The vacuum valve according to claim 6, wherein the valve element is made of an aluminum alloy, and the shaft is made of a stainless steel.

15. The vacuum valve according to claim 7, wherein the valve element is made of an aluminum alloy, and the shaft is made of a stainless steel.

16. The vacuum valve according to claim 8, wherein the valve element is made of an aluminum alloy, and the shaft is made of a stainless steel.

\* \* \* \* \*